United States Patent
Gerlach

(10) Patent No.: US 7,773,947 B2
(45) Date of Patent: Aug. 10, 2010

(54) METHOD FOR TERMINAL-ASSISTED INTERFERENCE CONTROL IN A MULTI-CARRIER MOBILE COMMUNICATION SYSTEM

(75) Inventor: Christian Georg Gerlach, Ditzingen (DE)

(73) Assignee: Alcatel, Paris (FR)

( * ) Notice: Subject to any disclaimer, the term of this patent is extended or adjusted under 35 U.S.C. 154(b) by 1245 days.

(21) Appl. No.: 11/151,301

(22) Filed: Jun. 14, 2005

(65) Prior Publication Data

US 2006/0014554 A1   Jan. 19, 2006

(30) Foreign Application Priority Data

Jul. 13, 2004   (EP)   .................................. 04291797

(51) Int. Cl.
| | |
|---|---|
| H04B 1/00 | (2006.01) |
| H04B 15/00 | (2006.01) |
| H04W 36/00 | (2009.01) |
| H04W 72/00 | (2009.01) |
| H04W 4/00 | (2009.01) |
| H04J 11/00 | (2006.01) |
| H04J 1/16 | (2006.01) |
| H04J 3/14 | (2006.01) |
| G01R 31/08 | (2006.01) |
| G06F 11/00 | (2006.01) |
| G08C 15/00 | (2006.01) |
| H04L 1/00 | (2006.01) |
| H04L 12/26 | (2006.01) |

(52) U.S. Cl. ........................ 455/63.1; 455/69; 455/436; 455/452.2; 455/501; 370/203; 370/252; 370/328; 370/332; 375/134; 375/260

(58) Field of Classification Search .............. 455/67.14, 455/68, 171.1, 415, 445, 446, 450, 452, 455, 455/456, 501, 522, 561, 452.2, 562.1, 63.1, 455/41.2, 69, 70, 418, 419, 422.1, 426.1, 455/432.3, 436, 439, 442, 502, 516, 434, 455/437, 438; 370/203, 208, 231, 328, 335, 370/491, 230, 232, 252, 329, 331, 332, 395.4, 370/412, 468, 527, 318, 330, 336, 342, 346, 370/350, 478; 375/134, 260, 354, 146, 368
See application file for complete search history.

(56) References Cited

U.S. PATENT DOCUMENTS 5,341,397 A   8/1994   Gudmundson (Continued)

FOREIGN PATENT DOCUMENTS

EP   0 637 895 A1   2/1995

OTHER PUBLICATIONS

3GPP: "OFDM with Interference control for improved HSDPA coverage," 3GPP TSG RAN WGI Meeting 37, May 2004, pp. 1-11, XP002310556.

*Primary Examiner*—Nay A Maung
*Assistant Examiner*—Paul P Tran
(74) *Attorney, Agent, or Firm*—Sughrue Mion, PLLC

(57) ABSTRACT

A method for terminal-assisted interference control in a mobile communication system employing multi-carrier techniques such as OFDM, the mobile communication system comprising a network with a plurality of base stations controlled by a central entity, and the base stations having means for communication with user terminals located inside their cell service area, wherein the central entity schedules time-frequency groups available, for data communication purposes between the terminals and the base station, for the base stations under its control and the terminals involved in the scheduling process, each time interval.

11 Claims, 3 Drawing Sheets

U.S. PATENT DOCUMENTS

| | | |
|---|---|---|
| 6,327,297 B1 | 12/2001 | Schilling |
| 2003/0169681 A1 | 9/2003 | Li et al. |
| 2004/0062193 A1* | 4/2004 | Ma et al. .................... 370/208 |
| 2004/0181569 A1* | 9/2004 | Attar et al. ................. 709/200 |
| 2004/0185853 A1* | 9/2004 | Kim et al. ................... 455/438 |
| 2004/0219926 A1* | 11/2004 | Kim et al. ................ 455/452.2 |
| 2004/0228267 A1* | 11/2004 | Agrawal et al. ............. 370/203 |
| 2004/0229625 A1* | 11/2004 | Laroia et al. ................ 455/450 |
| 2007/0008917 A1* | 1/2007 | Calcagno et al. ........... 370/328 |

* cited by examiner

METHOD FOR TERMINAL-ASSISTED INTERFERENCE CONTROL IN A MULTI-CARRIER MOBILE COMMUNICATION SYSTEM

BACKGROUND OF THE INVENTION

The invention is based on a priority application EP 04291797.1 which is hereby incorporated by reference.

The present invention relates to mobile communication systems, and more particularly, to a method for terminal-assisted interference control in mobile communication systems employing multiple sub-carriers, such as Orthogonal Frequency Division Multiplexing (OFDM) mobile communication systems.

In general, a mobile communication system supporting a wireless communication service comprises a radio access network communicating via an air interface with the user terminals. More particularly, the radio access network comprises a plurality of base stations controlled by a radio network controller (RNC), the base stations being in charge of communicating with the user terminals which are located inside their cell service area. As already well known in such cellular structures, generally the communication service provided to the user can substantially deteriorate due to neighbor cell interference or inter-cell interference.

In order to compensate the effects of inter-cell interference for user terminals located in defined cell regions and increase the quality of service received by the users in such regions, some interference control methods for an OFDM communication system are proposed in document "OFDM with interference control for improved HSDPA coverage", R1-04-0572, Montreal Canada, 10-14 May 2004. In said document, it is proposed that e.g. when the terminal moves inside a service overlapping region near the cell border, said terminal measures the pilot signal from the interfering neighbor base stations in that region and signals to the mobile radio network information about the strength of reception from these base stations. The mobile network, based on the terminal information, tries to reserve for that terminal the same time-frequency group for communication in the serving base station and at least one of the other base stations serving in the overlapping region.

Such prior art solution however uses a time-frequency group reservation procedure by the mobile network for an undefined time based on a prediction of traffic load on the concerned cells. Such systems have the disadvantage that a number of time-frequency groups are reserved for terminals during an undefined time interval, the time in which the terminal remains in a service overlapping region near the cell border, even though the groups may not actually be used in certain time slots for data transmission, thus wasting overall system capacity resources. The prior art solution does not take also into account the rest of the terminals which are not located in that service overlapping region, for example, the ones that are close to the serving base station, and does not take into account the whole inter-cell interference influence for all terminals involved in the scheduling of the time-frequency groups in a multi-cell scheduling scenario.

SUMMARY OF THE INVENTION

It is, therefore, the object of the invention to solve the aforesaid technical multi-carrier mobile communication system problems and provide an improved terminal-assisted interference control method.

The object is achieved, according to the invention, by a method for terminal-assisted interference control in a mobile communication system employing multi-carrier techniques such as OFDM, the mobile communication system comprising a network with a plurality of base stations controlled by a radio network controller, and the base stations having means for communication with user terminals located inside their cell service area, in which the terminals can receive at least two pilot channels in parallel, and time-frequency groups are used for data communication purposes between the terminals and the base station; wherein the terminals measure the pilot signal from a serving base station and neighbor base stations in the area where they are located, this area being anywhere inside the serving cell area, and send to the radio network controller information about the strength of reception from said serving base station and said neighbor base stations; and based on said information sent by the terminals about the strength of reception from the neighboring base stations and their serving base station, the actual packet availability of data packets which shall be sent to the terminals involved in the scheduling procedure in each time interval, and the power budget available for each base station; the radio network controller schedules the time-frequency groups available for the base stations under its control and the terminals involved in the scheduling procedure, in each time interval; the scheduling procedure comprising the steps of selecting a modulation and coding scheme for a communication channel between the network and the terminal, allocating power to the time-frequency groups; and coordinating the sent useful signal and the caused interference simultaneously or coordinating the sent useful signal and the same signal sent from two or more neighbor base stations simultaneously.

It is also achieved by a radio network controller for a mobile communication system comprising a network with a plurality of base stations controlled by the radio network controller, and the base stations having means for communication with user terminals located inside their cell service area it comprising means to receive and analyze information sent by the terminals about the strength of reception from their serving base station and a number of neighboring base stations; the actual packet availability of data packets which shall be sent to the terminals involved in the scheduling procedure in each time interval, and the power budget available for each base station; and means to schedule time-frequency groups available for the base stations under its control and the terminals involved in the scheduling procedure, in each time interval; the scheduling procedure comprising the steps of selecting a modulation and coding scheme for a communication channel between the network and the terminal, allocating power to the time-frequency groups, and coordinating the sent useful signal and the caused interference simultaneously or coordinating the sent useful signal and the same signal sent from two or more neighbor base stations simultaneously.

It is also achieved by a user terminal for a mobile communication system comprising a network with a plurality of base stations controlled by a radio network controller, and the base stations having means for communication with the user terminal located inside their cell service area it comprising means for receiving at least two pilot channels in parallel, means for measuring information about the strength of reception from its serving base station and a number of neighboring base stations, and for sending said information to the mobile radio network controller.

Advantageous configurations of the invention emerge from the dependent claims, the following description and the drawings. For example, it is seen advantageous that, by using the proposed invention, the use of the cellular system available radio resources is optimized for a number of terminals being served, said terminals not necessarily all being located in a service overlapping region. The interference control method according to the invention can be applied for all the terminals being served by the cellular network, thus increasing the overall throughput of the mobile system. Also advantageous is that the overall downlink direction inter-cell interference is reduced thus improving both the quality of service experienced by the users and the coverage of the base station service. Another advantage is that the transmission error rate is reduced.

BRIEF DESCRIPTION OF THE DRAWINGS

An embodiment example of the invention is now explained with the aid of FIGS. 1 to 4.

DETAILED DESCRIPTION OF THE DRAWINGS

Figure 1:
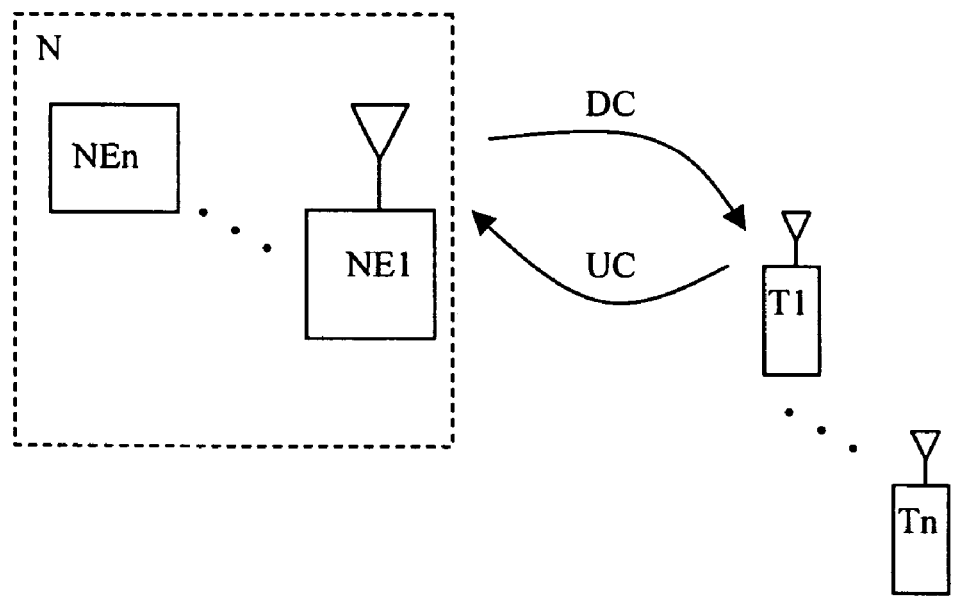
FIG. 1 illustrates a block diagram of a conventional OFDM mobile communications system including the network and the user terminals.

FIG. 1 shows a block diagram of a conventional OFDM mobile communications system in which a mobile radio network N, including a plurality of network elements NE1 to NEn, and a plurality of user terminals T1 to Tn exchange data information via an air interface downlink channel DC and an uplink channel UC using multi-carrier modulation schemes, at least in the downlink direction, such as OFDM. The network elements NE1 to NEn can be for example base stations, radio network controllers, core network switches, or any other communication elements which are generally used for wireless mobile communications.

Figure 2:
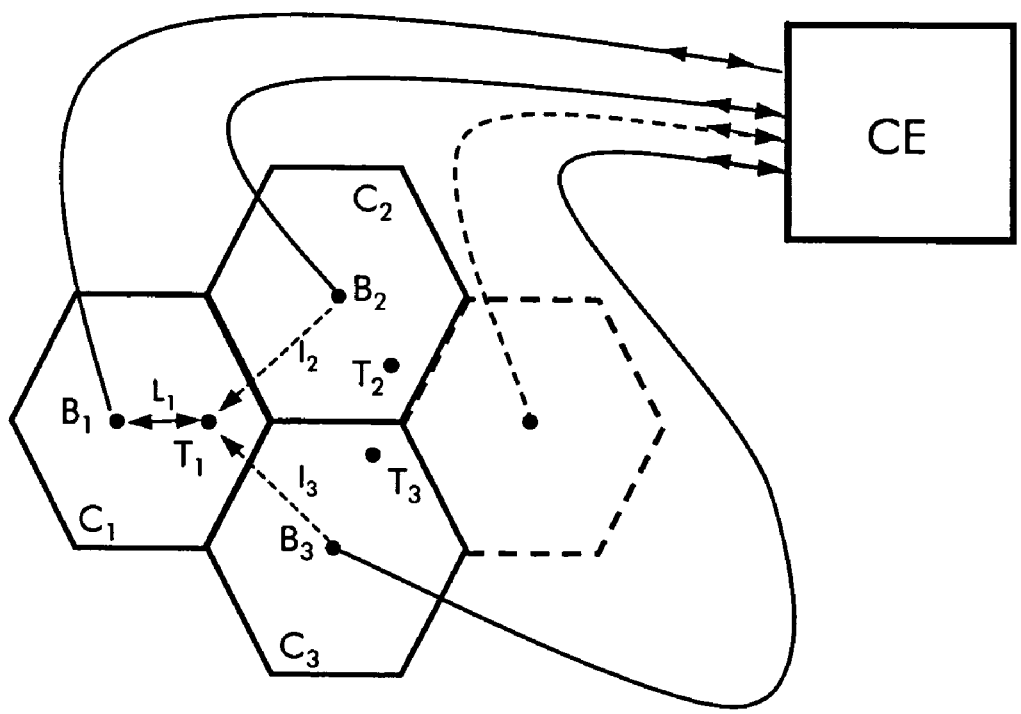
FIG. 2 shows a method for terminal-assisted interference control according to the invention.

FIG. 2 illustrates a method for terminal-assisted interference control according to the invention in an exemplary OFDM mobile cellular scenario comprising three terminals T1 to T3, three base stations B1 to B3 each actuating mainly on a service area cell C1 to C3, wherein the base stations are connected to a central element CE. A terminal T1 communicates with a serving base station B1 via an air communication link L1 and experiences inter-cell interference I2, I3 from neighbor base stations B2 and B3. The central element CE is a network element of the mobile network which could be, for example, a radio network controller, and will hereinafter be referred to as such.

As already known from prior art interference control methods, in the mobile communication system of FIG. 2 the terminals T1 to T3 can receive more than one pilot channel in parallel, e.g. a terminal T1 can receive three pilot channels in parallel, one from the serving base station B1 and two more from neighbor base stations B2 and B3. The OFDM time-frequency grid is partitioned in a number of orthogonal, non-overlapping time-frequency patterns, and said time-frequency patterns are combined in a number of time-frequency groups, i.e., each time-frequency group consisting of a number of time-frequency patterns. The mobile radio network N signals to the terminals T1 to T3 one of said time-frequency groups for communication purposes with their serving base station(s).

Now, according to the invention, the terminals T1 to T3 measure in any cell area the pilot signal from the serving and surrounding base stations B1 to B3 and send to them information about the strength of reception. The base stations B1 to B3 then forward this terminal information to the radio network controller CE. Then, based on a) the information sent by the terminals T1 to T3 about the strength of reception from the serving and neighboring base stations, b) the actual packet availability of data packets which shall be sent to the terminals involved in the scheduling procedure, and c) the power budget available for each base station B1 to B3, the radio network controller CE schedules the time-frequency groups available for the base stations under its control and the terminals T1 to T3 involved in the scheduling process in each time interval. The time interval is, according to the invention, a time interval which can be determined by the system and is periodically repeated as the time interval in which the scheduling procedure is carried out. This can be any periodically repeated time interval such as, for example, the time length of the time-frequency pattern.

The scheduling procedure carried out by the radio network controller CE comprises, in each transmission time interval, selecting the time-frequency pattern for each communication channel, allocating the power available between the time frequency groups e.g. a time-frequency group can be used in a base station B1 for a terminal T1 and the same time-frequency group may be used in another base station B2 for the same terminal T1 or another terminal T2, selecting a modulation and coding scheme for the communication channel, e.g. 64 Quadrature Amplitude Modulation (QAM), 16 QAM, Quadrature Phase Shift Keying (QPSK), and ½ rate or ⅓ rate channel coding, coordinating the sent useful signal and the caused interference simultaneously i.e. also the signal-to-interference ratio for each transmission; or coordinating the sent useful signal and the same signal sent from a neighbor base station.

For example, the radio network controller CE can start first with reservation of time-frequency groups for the terminals located in service overlapping regions near the cell border and with power limitation in the neighbor cells, this reservation being based on average load in the cells to find a preliminary scheduling as known from prior art. Then, according to the invention, in one or further steps, by considering packet availability for said terminals and the calculation of the predictable caused interference due to this preliminary scheduling using the strength of reception measurements for the involved terminals, it can go on with a) a new power and time-frequency group allocation, or b) keeping of the selected power and time-frequency allocation but making a new selection of the modulation and coding schemes based on the calculated interference.

Also according to the invention, the radio network controller CE can also optionally take into account the rescheduling needed, because of automatic request mechanisms due to false reception of packets, for the time-frequency group scheduling process.

As already mentioned, when the scheduling is done every time interval for all terminals in the cellular system a system-wide optimization of throughput and quality of service is achieved.

Figure 3:
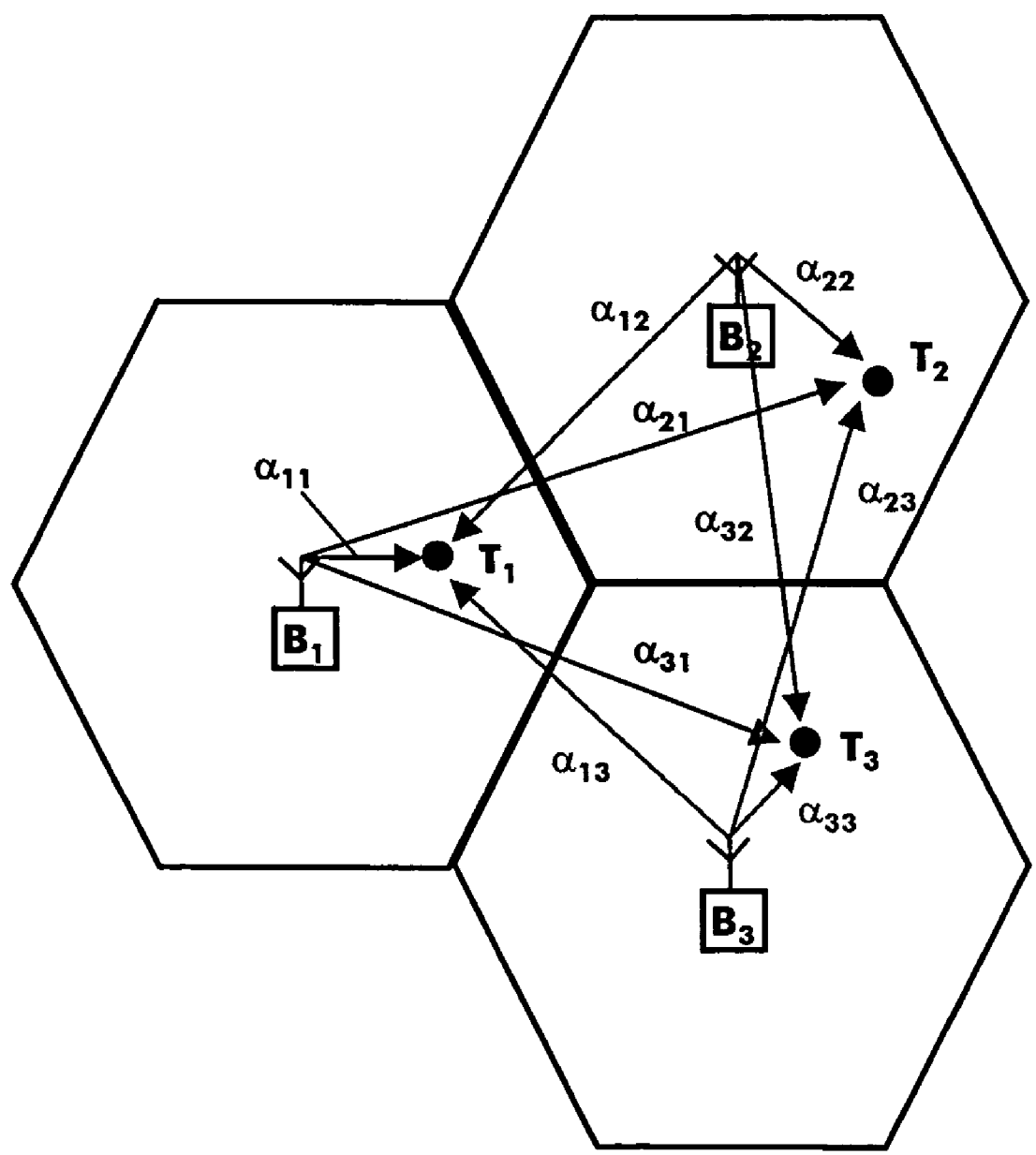
FIG. 3 shows an example of how terminal measurements are carried out in a cellular system using the method for terminal-assisted interference control according to the invention.

FIG. 3 shows three terminals T1 to T3 that are influenced more or less by neighbor base stations. The terminals T1 to T3, located anywhere in the cell region, measure information about the strength of reception $\alpha 11$ to $\alpha 33$ from their respective serving base station and neighbor base stations. For example, a terminal T1 being served by a base station B1 measures information about the strength of reception $\alpha 11$ it experiences from said serving base station B1 and also about the cross-coupling strength of reception $\alpha 12$ and $\alpha 13$ from two neighbor base stations B2 and B3. Such measurements are sent e.g. by the terminal T1 to its serving base station B1, which further forwards them to the radio network controller CE. The radio network controller CE, according to the invention, uses this strength of reception measurement information $\alpha 11$ to $\alpha 33$ received from the terminals involved in the scheduling procedure to calculate the interference experienced by such terminals from the neighbor base stations and as one decision element for the time-frequency scheduling procedure.

For the sake of completeness, at this point, when the radio network controller CE assigns a time-frequency group to the terminal T1 for communication, said communication can be carried out in the following two ways:

A. The mobile radio network N may coordinate the radio serving by using two or more base stations B1 to B3 for synchronized communication with the terminal. The data traffic is then forwarded from the radio network controller to the serving base stations, which will then transmit with the same time-frequency group and with the same information-bearing signal in a synchronized fashion.

B. the mobile radio network N may decide to coordinate interference by reducing the power transmitted by the interfering base stations B2 and B3 in the time-frequency group used by the terminal T1 exactly as given by all the cross-coupling strength of reception information $\alpha 12$ to $\alpha 13$ in relation to its strength of reception information $\alpha 11$, so that interference is reduced so much as desired.

Figure 4:
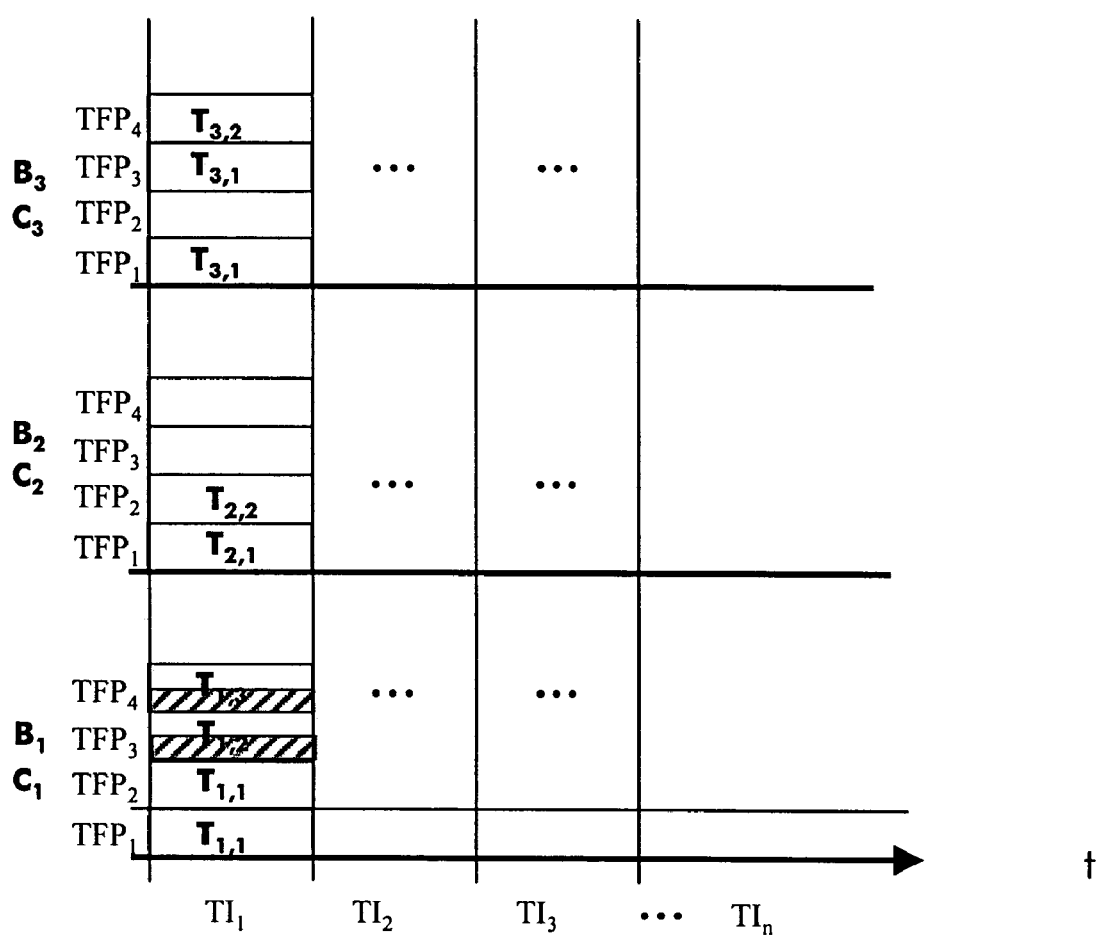
FIG. 4 shows an exemplary time-frequency pattern scheduling diagram which can be performed for terminal-assisted interference control according to the invention.

FIG. 4 shows an exemplary time-frequency pattern TFP1 to TFP4 scheduling diagram for seven terminals T1,1 to T3,2 located in three cells C1 to C3 served by three base stations B1 to B3. The scheduling decisions for the use of the time-frequency patterns for the terminals is done every time interval TI1 to TIn.

In the example of FIG. 4, time-frequency patterns TFP1 and TFP2 constitute a time-frequency group which is used by terminal T1,1 in cell C1. Said time-frequency patterns TFP1 and TFP2 do not constitute a group in cell C2 and are used independently by terminals T2,1 and T2,2. In cell C3, on the other hand, time-frequency patterns TFP1 and TFP3 constitute a time-frequency group used by terminal T3,1.

Time frequency patterns TFP3 and TFP4 in cell C1 are used for communication with terminals T1,2 and T1,3 with limited power to avoid interference with time-frequency patterns TFP3 and TFP4 in cell C3. This may happen if terminals T3,1 and T3,2 of cell C3 are close to the border and near to cell C1.

For the sake of generalization, it shall be understood, that although for the explanation of the present invention a mobile communication system with OFDM modulation scheme has been used, the above proposals can in principle as well be adapted to mobile communication systems with any multi-carrier modulation scheme apart from OFDM.

It shall be also understood that means to carry out the terminal-assisted interference control described herein can be located anywhere in the mobile radio network N, that is, in a network element NE such as a base station or a radio network controller or by means of a radio resource manager entity, inside or outside the network elements NE, said means being implemented in a hardware and/or software form.

The invention claimed is:

1. A method for terminal-assisted interference control in a mobile communication system which uses multiple sub-carriers, the mobile communication system comprising a network with a plurality of base stations controlled by a radio network controller, and at least one of the plurality of base stations having means for communication with at least one of a plurality of user terminals located inside a cell service area served by a serving base station selected from the plurality of base stations, said at least one user terminal capable of receiving at least two pilot channels in parallel, and wherein time-frequency groups are used for data communication purposes between the at least one user terminal and the at least one base station, said method comprising:

measuring, by the at least one user terminal, a pilot signal from the serving base station and a pilot signal from at least one neighbor base station, which neighbors an area in which the user terminal is located, the area being anywhere inside the cell service area served by the serving base station;

sending, by the at least one user terminal, information about a strength of reception from said serving base station and said at least one neighbor base station to the radio network controller;

scheduling, by the radio network controller, the time-frequency groups available for the plurality of base stations controlled by the radio network controller and the at least one user terminals involved in a scheduling procedure, in each time interval based on the information sent by the at least one user terminals about the strength of reception from at least one neighbor base station and the serving base station, an actual packet availability of data packets which shall be sent to the at least one user terminal involved in the scheduling procedure in each time interval, and a power budget available for each of the plurality of base stations; and wherein the scheduling procedure comprises:

selecting a modulation and coding scheme for a communication channel between the network and the at least one user terminal, allocating power to the time-frequency groups, and coordinating the useful signals sent from the serving base station and interference caused by signals sent by the at least one neighbor base stations simultaneously or coordinating the useful signal sent from the serving base station and the same useful signals sent -from two or more neighbor base stations simultaneously.

2. The method for terminal-assisted interference control of claim 1 wherein the time intervals are a determined periodically repeated time interval.

3. The method for terminal-assisted interference control of claim 2 wherein the periodically repeated time interval is determined as the time length of the time-frequency pattern.

4. The method for terminal-assisted interference control of claim 1 wherein the radio network controller schedules the time-frequency groups:

in a first step by doing a preliminary cell-wise reservation of time-frequency groups to terminals located in a service overlapping region near to the cell border and assuming a power limitation for the neighbor cells and without taking data availability into account, so as to find a scheduling decision for each base station independently of the decision for the other cells, in a next step taking into account the data packet availability in each time interval for said terminals located in a service overlapping region, and in further steps taking into account the interference situation in each time interval of all the terminals involved in the scheduling process.

5. The method for terminal-assisted data driven global interference control of claim 1 wherein the radio network controller further takes into account the rescheduling needed, because of automatic request mechanisms, due to false reception of packets, for the time-frequency group scheduling procedure.

6. The method for terminal-assisted interference control of claim 1 wherein the scheduling is done for all of the plurality of base stations and all of the plurality of user terminals of the mobile communication system in each time interval in order to optimize the throughput of the overall communication system or another system-wide quality criteria.

7. The method for terminal-assisted interference control of claim 1 wherein the mobile communication system is an Orthogonal Frequency Division Multiplexing mobile communication system.

8. A radio network controller for a mobile communication system, said mobile communication system comprising a network with a plurality of base stations controlled by the radio network controller, and the base stations having means for communication with a plurality of user terminals located inside their cell service area, said radio network controller comprising:
   means to receive and analyze:
      information sent by at least one of the plurality of user terminals about a strength of reception of a plurality of signals received from a serving base station selected from the plurality of base stations, said serving base station serving the area in which the at least one user terminal is located and a number of neighboring base stations located in areas neighboring the area in which the at least one user terminal is located,
      an actual packet availability of data packets is sent to the at least one user terminals involved in a scheduling procedure in each time interval, and
      a power budget available for each of the base stations; and
   means to schedule time-frequency groups available for the base stations under the control of the radio network controller and the at least one user terminals involved in the scheduling procedure, in each time interval;
   the scheduling procedure comprising:
      selecting a modulation and coding scheme for a communication channel between the network and the terminal,
      allocating power to the time-frequency groups, and
      coordinating useful signals sent from the serving base station and interference caused by signals sent by the neighboring base stations simultaneously or coordinating the useful signal sent from a serving base station and the same useful signals sent from two or more neighbor base stations simultaneously.

9. The radio network controller of claim 8 further comprising means for determining a periodically repeated time interval in which the time-frequency group scheduling procedure is carried out.

10. The radio network controller of claim 8 further comprising means for analyzing a rescheduling needed due to false reception of packets for the time-frequency group scheduling procedure.

11. A user terminal for a mobile communication system, said mobile communications system comprising a network with a plurality of base stations controlled by a radio network controller, and the base stations having means for communication with the user terminal located inside their cell service area, said user terminal comprising:
   means for receiving at least two pilot channels in parallel,
   means for measuring information about a strength of reception from a serving base station selected from the plurality of base stations, said serving base station serving the area in which the user terminal is located and a number of neighbor base stations located in areas neighboring the area in which the user terminal is located, the areas being anywhere inside the cell service area served by the serving base station, and for sending said information to the radio network controller,
   wherein the radio network controller schedules time-frequency groups available for the plurality of base stations controlled by the radio network controller and the user terminal involved in a scheduling procedure, in each time interval based on
   the information sent by the user terminal about the strength of reception from one of the neighbor base stations and the serving base station,
   an actual packet availability of data packets which shall be sent to the user terminal involved in the scheduling procedure in each time interval, and
   a power budget available for each of the plurality of base stations; and wherein the scheduling procedure comprises:
   selecting a modulation and coding scheme for a communication channel between the network and the user terminal,
   allocating power to the time-frequency groups, and
   coordinating the useful signals sent from the serving base station and interference caused by signals sent by the at least one neighbor base stations simultaneously or coordinating the useful signal sent from the serving base station and the same useful signals sent from two or more neighbor base stations simultaneously.

* * * * *